(12) United States Patent
Yae (10) Patent No.: US 11,328,725 B2
(45) Date of Patent: May 10, 2022

(54) APPARATUS AND METHOD FOR RECOGNIZING A VOICE IN A VEHICLE

(71) Applicants: HYUNDAI MOTOR COMPANY, Seoul (KR); KIA MOTORS CORPORATION, Seoul (KR)

(72) Inventor: Seong Soo Yae, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 155 days.

(21) Appl. No.: 16/991,789

(22) Filed: Aug. 12, 2020

(65) Prior Publication Data

US 2021/0264911 A1  Aug. 26, 2021

(30) Foreign Application Priority Data

Feb. 21, 2020 (KR) .......................... 10-2020-0021779

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01); *G10L 2015/227* (2013.01)

(58) Field of Classification Search
CPC ...................................................... G10L 15/22
See application file for complete search history.

(56) References Cited

U.S. PATENT DOCUMENTS

2015/0039319 A1* 2/2015 Mei ...................... G10L 15/1822
704/275
2015/0279368 A1* 10/2015 Contolini ................. A61B 5/00
704/246

* cited by examiner

*Primary Examiner* — Ibrahim Siddo
(74) *Attorney, Agent, or Firm* — Lempia Summerfield Katz LLC (57) ABSTRACT

An apparatus for recognizing a voice in a vehicle includes an input device for receiving a voice command and a controller. The controller: determines whether a number of the voice commands is at least two; determines whether the voice commands are able to be executed based on a preset priority, when the number of the voice commands is at least two; calculates an execution sequence of the voice commands based on the determination result; and allows operations corresponding to the voice commands to be executed based on the calculated execution sequence of the voice commands. When the plurality of voice commands is input, the operations corresponding to the voice commands are executed in an optimized manner.

20 Claims, 5 Drawing Sheets

APPARATUS AND METHOD FOR RECOGNIZING A VOICE IN A VEHICLE

CROSS-REFERENCE TO RELATED APPLICATION

This application claims the benefit of priority to Korean Patent Application No. 10-2020-0021779, filed in the Korean Intellectual Property Office on Feb. 21, 2020, the entire contents of which are incorporated herein by reference.

TECHNICAL FIELD

The present disclosure relates to an apparatus and method for recognizing a voice in a vehicle.

BACKGROUND

Recently, as voice recognition technology has been advanced, a technique being developed is that a user's voice on the vehicle is recognized even in a vehicle, and the vehicle is controlled to execute an operation corresponding to a user's voice commands. In particular, even when a user inputs two or more voice commands, a scheme in which operations corresponding to the commands may be performed is under development. In general, when two or more voice commands are input from the user to the vehicle, the operations corresponding to the voice commands are executed in an order in which the voice commands are input. In this case, voice recognition technology must be developed so that the operations corresponding to the commands may be performed in an optimized state such that an unnecessary operation is not executed.

SUMMARY

The present disclosure has been made to solve the above-mentioned problems occurring in the prior art while advantages achieved by the prior art are maintained intact.

An aspect of the present disclosure provides an apparatus and a method for recognizing a voice in a vehicle, in which when a plurality of voice commands is input, operations corresponding to commands are executed in an optimized manner.

The technical problems to be solved by the present disclosure are not limited to the aforementioned problems, and any other technical problems not mentioned herein should be clearly understood from the following description by those having ordinary skill in the art to which the present disclosure pertains.

An apparatus for recognizing a voice in a vehicle includes an input device for receiving a voice command, and a controller, which determines whether the number of the voice commands is at least two. The controller further determines whether the voice commands are able to be executed based on a preset priority, when the number of the voice commands is at least two. The controller further calculates an execution sequence of the voice commands based on the determination result. The controller further allows operations corresponding to the voice commands to be executed based on the calculated execution sequence of the voice commands.

The controller may determine a domain corresponding to each of the voice commands, and a final purpose related to the voice commands.

The priority may be set based on an urgency level allocated to each domain.

The controller may determine whether an operation unnecessary to achieve the final purpose is included in the operations corresponding to the voice commands and may determine that the voice commands are not able to be executed based on the preset priority, when determining that the unnecessary operation may be included.

The controller may exceptionally process the voice commands, when determining that the voice commands are not able to be executed based on the preset priority and may store the operations corresponding to the exceptionally processed voice commands.

The controller may remove the unnecessary operation.

The controller may calculate the execution sequence of the voice commands based on the operations corresponding to the exceptionally processed voice commands.

When the domains corresponding to the at least two voice commands are different from each other, and when the execution sequence of the input voice commands is able to be changed based on the preset priority, the controller may determine that the voice commands are able to be executed based on the preset priority and may calculate the execution sequence of the voice commands based on the preset priority.

When the domains corresponding to the at least two voice commands are different from each other, and when an order in which the voice commands are input is the same as the preset priority, the controller may determine that the voice commands are able to be executed based on the preset priority and may calculate the execution sequence of the voice commands based on the preset priority.

When the domains corresponding to the at least two voice commands are the same as each other, and when the operations corresponding to the voice commands are able to be executed in an order in which the voice commands are input, the controller may determine that the voice commands are able to be executed based on the preset priority and may calculate the execution sequence of the voice commands based on the order in which the voice commands are input.

A method for recognizing a voice in a vehicle includes: receiving a voice command; determining whether a number of the voice commands is at least two; determining whether the voice commands are able to be executed based on a preset priority, when the number of the voice commands is at least two; calculating an execution sequence of the voice commands based on the determination result; and executing operations corresponding to the voice commands based on the calculated execution sequence of the voice commands.

The method may further include, after receiving the voice command, determining a domain corresponding to each of the voice commands, and determining a final purpose related to the voice commands.

The priority may be set based on an urgency level allocated to each domain.

The determining of whether the voice commands are able to be executed based on the preset priority may include determining whether an operation unnecessary to achieve the final purpose is included in the operations corresponding to the voice commands and may include determining that the voice commands are not able to be executed based on the preset priority, when determining that the unnecessary operation may be included.

The method may further include excluding the voice commands when determining that the voice commands are not able to be executed based on the preset priority and may include storing the operations corresponding to the exceptionally processed voice commands.

The storing of the operations corresponding to the voice commands may include removing the unnecessary operation.

The calculating of the execution sequence of the voice commands based on the determination result may include calculating the execution sequence of the voice commands based on the operations corresponding to the exceptionally processed voice commands.

The calculating of the execution sequence of the voice commands based on the determination result may include determining that the voice commands are able to be executed based on the preset priority, when the domains corresponding to the at least two voice commands are different from each other, and when the execution sequence of the input voice commands is able to be changed based on the preset priority, and may include calculating the execution sequence of the voice commands based on the preset priority.

The calculating of the execution sequence of the voice commands based on the determination result may include determining that the voice commands are able to be executed based on the preset priority, when the domains corresponding to the at least two voice commands are different from each other, and when an order in which the voice commands are input is the same as the preset priority, and may include calculating the execution sequence of the voice commands based on the preset priority.

The calculating of the execution sequence of the voice commands based on the determination result may include determining that the voice commands are able to be executed based on the preset priority, when the domains corresponding to the at least two voice commands are same as each other, and when the operations corresponding to the voice commands are able to be executed in an order in which the voice commands are input, and may include calculating the execution sequence of the voice commands based on the order in which the voice commands are input.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

Figure 1:
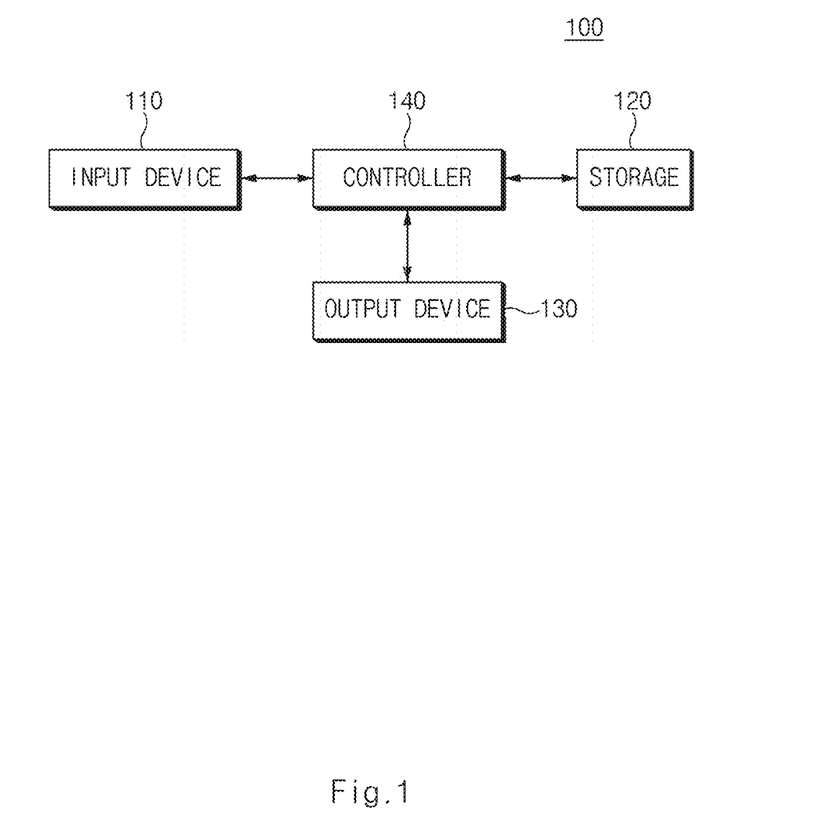
FIG. 1 is a configuration diagram showing a configuration of an apparatus for recognizing a voice in a vehicle according to an embodiment of the present disclosure.

FIG. 1 is a configuration diagram showing a configuration of an apparatus for recognizing a voice in a vehicle according to an embodiment of the present disclosure.

As shown in FIG. 1, an apparatus 100 for recognizing a voice in a vehicle according to an embodiment of the present disclosure may include an input device 110, a storage 120, an output device 130, and a controller 140.

When a user manipulates an operation command unit or performs a motion, the input device 110 may receive an input signal corresponding to the manipulation or the motion from the user. In one example, a voice command may be input from the user to the input device 110. According to an embodiment, when the user manipulates the operation command unit or performs the motion or generates the voice commands (e.g., a wake-up voice commands), the input device 110 may be activated to detect the user's voice. To this end, the input device 110 may be embodied as a button, a touch screen, a touch pad, a motion recognition sensor, etc. to detect the user's manipulation or motion. The input device 110 may be implemented as a microphone to recognize the user's voice. In addition, the input device 110 may convert a voice signal of the voice commands uttered from the user into an electrical audio signal and transmit the electrical audio signal to the controller 140.

The storage 120 may store therein at least one algorithm that performs computation or execution of various commands for operations of the apparatus for recognizing the voice in the vehicle according to an embodiment of the present disclosure. For this purpose, the storage 120 may include at least one storage medium selected from a flash memory, a hard disk, a memory card, ROM (Read-Only Memory), RAM (Random Access Memory), EEPROM (Electrically Erasable Programmable Read-Only Memory), PROM (Programmable Read-Only Memory), a magnetic memory, a magnetic disk, and an optical disc.

The output device 130 may output a determination result of the controller 140 as a voice or an image. To this end, the output device 130 may be implemented as a display apparatus or a sound output apparatus.

The controller 140 may be implemented as a processing device including a microprocessor with a built-in semiconductor chip or the like capable of performing computation or execution of the various command. The controller 140 may control an overall operation of the apparatus for recognizing the voice in the vehicle according to an embodiment of the present disclosure. Specifically, the controller 140 may determine whether the number of the voice commands input to the input device 110 is at least two. When the number of the voice commands is at least two, the controller 140 may determine whether the voice commands are able to be executed based on a preset priority. Then, the controller 140 may calculate an execution sequence of the voice commands based on the determination result. Then, the controller 140 may execute the operations corresponding to the voice commands based on the calculated execution sequence of the voice commands.

More specifically, when the voice commands of the user are input to the input device 110, the controller 140 may analyze the voice commands uttered from the user and determines a domain, to which the spoken voice commands belong, based on the analysis result. Further, the controller 140 may determine a purpose related to the spoken voice commands, based on the analysis result. According to an embodiment, the controller 140 may derive an analysis result value in a form of a combination of the spoken voice commands and the corresponding domain.

The controller 140 may classify the analysis result value. According to an embodiment, the controller 140 may classify the analysis result value for each voice command. Thus, the number of classified combinations of the analysis result value may equal to the number of the voice commands (e.g., (domain 1+cmd 1), (domain 2+cmd 2), . . . , (domain N+cmd N)).

The controller 140 determines whether the number of the voice commands input from the user is at least two, based on the classifications of the analysis result. When the controller 140 determines that the number of the voice commands input from the user is at least two, the controller 140 may calculate the execution sequence of the at least two voice commands and may execute the operations corresponding to the voice commands based on the calculated execution sequences of the voice commands.

When the controller 140 calculates the execution sequence of at least two voice commands, the controller 140 may determine whether the voice commands are able to be executed based on a preset priority. The controller 140 may calculate the execution sequence of the voice commands based on the determination result. Moreover, the controller 140 may execute the operations corresponding to the voice commands based on the calculated execution sequence of the voice commands. In this connection, the priority may be set based on an urgency level assigned to the domain. According to an embodiment, the priority according to the urgency level assigned to the domain may be represented as shown in Table 1.

TABLE 1

| Priority | Domain | Voice commands |
|---|---|---|
| 1 | Urgent mode | Make urgent call |
| 2 | Advanced driver-assistance systems (ADAS) | Turn on autonomous drive |

TABLE 1-continued

| Priority | Domain | Voice commands |
|---|---|---|
| 3 | Vehicle (air conditioning) control | Turn off air conditioner |
| 4 | Multimedia control | Turn on radio |
| 5 | Navigation control | Guide me to home |
| 6 | Schedule | Inform me of today schedule |
| . . . | . . . | . . . |
| N | X | Y |

According to an embodiment of the present disclosure, when the controller 140 calculates the execution sequence of the voice commands input from the user, the controller 140 may set four rules, may determine which of the four rules is satisfied based on the voice commands input from the user, and may calculate the execution sequence based on the determination result.

The controller 140 may determine whether the voice commands input from the user satisfy the first rule. When the first rule is satisfied, the controller 140 may calculate the execution sequence of the voice commands that satisfy the first rule.

Moreover, when the controller 140 determines that the voice commands input from the user do not satisfy the first rule, the controller 140 may determine whether the second rule is satisfied based on the voice commands input from the user. When the second rule is satisfied, the controller 140 may calculate the execution sequence of the voice commands that satisfy the second rule.

Moreover, when the controller 140 determines that the voice commands input from the user do not satisfy the second rule, the controller 140 may determine whether the third rule is satisfied based on the voice commands input from the user. When the third rule is satisfied, the controller 140 may calculate the execution sequence of the voice commands that satisfy the third rule.

Moreover, when the controller 140 determines that the voice commands input from the user do not satisfy the third rule, the controller 140 may determine whether the fourth rule is satisfied based on the voice commands input from the user. When the fourth rule is satisfied, the controller 140 may calculate the execution sequence of the voice commands that satisfy the fourth rule.

Moreover, when the controller 140 determines that the voice commands input from the user do not satisfy the fourth rule, the controller 140 may determine that execution of the voice commands is impossible.

Hereinafter, a method of calculating the execution sequence of the voice commands that satisfy the first rule is described with reference to an embodiment.

According to an embodiment, the controller 140 determines whether the domains corresponding to the voice commands are the same as each other. Upon determining that the domains are not the same as each other based on the result of the determination, and determining that the voice commands are not executable based on the preset priority shown in Table 1, the controller 140 may determine that the voice commands input from the user satisfy the first rule. When the controller 140 determines that the voice commands input from the user satisfy the first rule, the controller 140 may exceptionally process the voice commands, and store information of operations corresponding to the exceptionally processed voice commands, and calculate the execution sequence of the voice commands based on the stored information.

In one example, when the voice commands input from the user are 'drive autonomously, and go home', the controller 140 may analyze the input voice commands, may identify the domains corresponding to the voice commands as ADAS and navigation control. Thus, the controller 140 may determine that the domains corresponding to the two voice commands are different from each other. In addition, the controller 140 may derive (ADAS+drive autonomously) and (navigation control+go home) as the analysis result value.

The controller 140 may determine, based on the analysis result value, whether the voice commands are able to be executed based on a preset priority. Because destination setting is necessary to perform ADAS, the controller 140 may determine that the voice commands are not able to be executed based on the preset priority. Therefore, the controller 140 may determine that the voice commands input from the user satisfy the first rule and may exceptionally process the voice commands, and may not operate ADAS at the highest priority, and allows navigation setting to be performed first. In addition, the controller 140 may store the exceptionally processed voice commands, and newly set information corresponding to the exceptionally processed voice commands into the storage. The controller 140 may calculate the execution sequence of the voice commands based on the stored information. Moreover, the controller 140 may rearrange the operations according to the calculated execution sequence such that the autonomous driving may be performed after the navigation setting operation. When the operations are rearranged according to the calculated execution sequence, the controller 140 may generate a message "I will start autonomous driving home" and may control the output device 130 to output the message. Then, the controller 140 may execute the operations according to the calculated execution sequence.

In another example, when the voice commands input from the user are 'inform me of schedule, and guide me home', the controller 140 analyzes the input voice commands and determines the domains corresponding to the voice commands as the schedule and the navigation control. and the controller 140 thus determines that the domains corresponding to the two voice commands are different from each other. In addition, the controller 140 may derive (schedule+inform me of schedule), and (navigation control+guide me home) as the analysis result value.

The controller 140 may determine, based on the analysis result value, whether the voice commands are able to be executed based on the preset priority. The schedule information may be collected and the user may be guided to the home. In this connection, when the controller 140 determines that an event occurring within a predetermined time from a current time is detected, (for example, when the controller 140 determines, based on the collected schedule information, that there is a meeting in an office in 30 minutes from the current time), the controller 140 may determine that the voice commands are not able to be executed based on the preset priority. Therefore, the controller 140 may determine that the voice commands input from the user satisfy the first rule. The controller 140 may also exceptionally process the voice commands. The controller 140 may also provide the collected schedule information to the user and may request the user to check the schedule information. According to an embodiment, the controller 140 may request user confirmation whether to first go to a destination to perform the schedule or to perform the voice commands uttered from the user. In an example, the controller 140 may generate a guide message "A meeting will occur in an office in 30 minutes" and "Will I move to the office and then guide you home?".

The message may be provided to the user. The controller 140 may request user confirmation thereof. In addition, when the controller 140 requests the confirmation from the user and receives a response from the user, the controller may allow corresponding operations to be executed based on the user's response. According to an embodiment, when the controller 140 determines that the user agrees with the guide suggestion, the controller 140 may be configured to set a destination to the office, and to execute an operation to guide the user to the home. In addition, the controller 140 may generate and output a message "Would you like to guide you home?" when the vehicle arrives at the office and the user gets off the vehicle and then the user again gets on the vehicle. When a response is received from the user, the controller 140 may execute an operation based on the user's response. The controller 140 may store the exceptionally processed voice commands, and the newly set execution sequence information based on the exceptionally processed voice commands into the storage. The execution sequence of the voice commands may be calculated by the controller 140, based on the stored information. Moreover, the controller 140 may rearrange the operations according to the calculated execution sequence and may allow the operations to be performed according to the calculated execution sequence.

Hereinafter, a method of calculating an execution sequence of voice commands that satisfy the second rule is described with reference to an embodiment According to an embodiment, the controller 140 determines whether domains corresponding the voice commands are the same. Upon determining that the domains are the same as each other based on a result of the determination, and determining that the voice commands are not able to be executed based on the preset priority shown in Table 1, the controller 140 may determine that the voice commands input from the user satisfy the second rule. When the controller 140 determines that the voice commands input from the user satisfy the second rule, the controller 140 may exceptionally process the voice commands, and may store information of the operation corresponding to the exceptionally processed voice commands, and may calculate the execution sequence of the voice commands based on the stored information. Hereinafter, a method of calculating an execution sequence of the voice commands that satisfy the second rule is described with reference to an embodiment.

In one example, when the voice commands input from the user are 'Turn off an air conditioner, and warm up', the controller 140 may analyze the input voice commands, and determine that the domains corresponding to the voice commands are the same, i.e., are the vehicle air conditioning control, and then, derive (vehicle air conditioning control+ turn off an air conditioner) and (vehicle air conditioning control+warm up) as the analysis result value.

The controller 140 may determine, based on the analysis result value, whether the voice commands are able to be executed based on the preset priority. To this end, when the domains corresponding to the at least two voice commands are the same, the controller 140 may determine a final purpose related to the voice commands based on the input voice commands. When an unnecessary operation to achieve the final purpose is included in the operations corresponding to the input voice commands, the controller 140 may determine that the voice commands are not able to be executed based on the preset priority. In one example, when the voice commands input from the user are 'Turn off an air conditioner, and warm up', the controller 140 may determine that the operation corresponding to the input voice commands includes an operation to turn off the air conditioner of the vehicle, an operation to turn on the air conditioner of the vehicle again, and an operation to increase a temperature. The controller 140 may determine the final purpose related to the input voice commands as increasing the temperature inside the vehicle. In this case, in order to increase the temperature inside the vehicle, the controller 140 may determine the operation of turning off the air conditioner of the vehicle as the unnecessary operation. Thus, the controller 140 may determine that the above-mentioned voice commands are not able to be executed based on the preset priority.

Therefore, the controller 140 may determine that the voice commands input from the user satisfy the second rule, and may exceptionally process the input voice commands, and may remove the unnecessary operation to adjust the execution sequence. The controller 140 may store the exceptionally processed voice commands, and a newly set execution sequence information based on the exceptionally processed voice commands in the storage. In addition, the controller 140 may calculate the execution sequence of the voice commands based on the stored information and then may rearrange the operations according to the calculated execution sequence. The controller 140 then may execute the operations in the calculated execution sequence.

In another example, when the voice commands input from the user is 'Warm up and turn on a heating wire', the controller 140 may analyze the input voice commands, and determines that the domains corresponding to the voice commands are the vehicle air conditioning control, and that the domains corresponding to the two voice commands are the same. The controller 140 may derive (vehicle air conditioning control+warm up) and (vehicle air conditioning control+turn on a heating wire) as the analysis result value.

The controller 140 may determine, based on the analysis result value, whether the voice commands are able to be executed based on the preset priority. To achieve this purpose, the controller 140 may determine whether the voice commands are able to be executed based on an order in which the user inputs the voice commands to achieve a final purpose related to the input voice commands. In one example, when the voice commands input from the user is 'Warm up and turn on a heating wire', the controller 140 may determine the final purpose as warming the user. Thus, the controller 140 may determine that it is desirable to first perform an operation for turning on the heating wire and may determine that the above-mentioned voice commands are not able to be executed based on the preset priority.

Therefore, the controller 140 may determine that the above-mentioned voice commands satisfy the second rule, and may exceptionally process the input voice commands, and may remove the unnecessary operation to adjust the execution sequence. The controller 140 may store the exceptionally processed voice commands, and a newly set execution sequence information based on the exceptionally processed voice commands in the storage. In addition, the controller 140 may calculate the execution sequence of the voice commands based on the stored information and then may rearrange the operations according to the calculated execution sequence and may execute the operations in the calculated execution sequence.

Hereinafter, a method of calculating an execution sequence of voice commands that satisfy the third rule is described with reference to an embodiment.

According to an embodiment, the controller 140 may determine whether the domains corresponding to the voice commands are the same. Upon determining that the domains are different from each other based on a result of the determination, and determining that the voice commands are able to be executed based on the preset priority shown in Table 1, the controller 140 may determine that the voice commands input from the user satisfy the third rule. When the controller 140 determines that the voice commands input from the user satisfy the third rule, the controller 140 may calculate the execution sequence of the voice commands based on the preset priority shown in Table 1. Hereinafter, a method of calculating an execution sequence of voice commands that satisfy the third rule is described with reference to an embodiment.

In an example, when the voice commands input from the user are 'Go home and open a window'. The controller 140 may analyze the input voice commands and may determine that the domains corresponding to the voice commands are the navigation control and the vehicle air conditioning control respectively. Thus, the controller 140 may determine that the domains corresponding to the two voice commands are different from each other. Thus, the controller 140 may derive (navigation control+go home) and (vehicle air conditioning control+open a window) as an analysis result value.

The controller 140 may determine, based on the analysis result value, whether the voice commands are able to be executed based on the preset priority. When the controller 140 may determine that an order in which the voice commands are input from the user is able to be changed based on the preset priority, the controller 140 may determine that the voice commands are able to be executed based on the preset priority. Therefore, the controller 140 may determine that the voice commands input from the user satisfy the third rule. Based on the preset priority, the vehicle air conditioning control has a higher priority than the navigation control. Thus, the controller 140 may calculate the execution sequence of the voice commands such that the window is first open and then the vehicle goes home. In addition, the controller 140 may rearrange the operations according to the calculated execution sequence and may execute the operations.

Hereinafter, a method of calculating an execution sequence of voice commands that satisfy the fourth rule is described with reference to an embodiment.

According to an embodiment, when an order in which the voice commands are input from the user is the same as the preset priority, the controller 140 may determine that the voice commands are able to be executed based on the preset priority, and may determine that the voice commands input from the user satisfy the fourth rule. Moreover, the controller 140 determines whether the domains according to voice commands are the same. Upon determining that the domains are the same based on the result of the determination and determining that the operations corresponding to the voice commands are able to be executed in the order in which voice commands are input from the user, the controller 140 may determine that the voice commands are able to be executed based on the preset priority, and may determine that the voice commands input from the user satisfy the fourth rule. When the controller 140 determines that the voice commands input from the user satisfy the fourth rule, the execution sequence of the voice commands is calculated by the controller 140 based on the preset priority shown in Table 1. Hereinafter, a method of calculating an execution sequence of voice commands that satisfy the fourth rule is described with reference to an embodiment.

In one example, when the voice commands input from the user are 'start-up and play a music', the controller 140 may analyze the input voice commands, and may derive (vehicle control+start-up) and (multimedia control+play a music) as the analysis result value.

The controller 140 may determine, based on an analysis result value, whether the voice commands are able to be executed based on the preset priority. When the controller 140 determines that the order in which the operations corresponding to the voice commands are executed based on the order in which the voice commands are input is the same as the preset priority, i.e., when the order of a vehicle control and a subsequent multimedia control is the same as the preset priority, the controller 140 may determine that the operations corresponding to the voice commands are able to be executed based on the preset priority. Therefore, the controller 140 may determine that the voice commands input from the user satisfy the fourth rule. Then, the execution sequence of the voice commands may be calculated by the controller 140 based on the preset priority. In addition, the controller 140 may rearrange the operations according to the calculated execution sequence and then may execute the operations.

In another example, when the voice commands input from the user is 'Enlarge a map, and guide me home', the controller 140 may analyze the input voice commands, and may determine that the domains corresponding to the voice commands are the navigation control, and that the domains corresponding to the at least two voice commands are the same. In addition, the controller may derive (navigation control+enlarge a map) and (navigation control+guide me home) as an analysis result value.

The controller 140 may determine, based on the analysis result value, whether the operations corresponding to the voice commands are able to be executed based on the preset priority. When the controller 140 determines that the operations corresponding to the voice commands are able to be executed in the order in which the voice commands are input, the controller 140 may determine that the operations corresponding to the voice commands are able to be executed based on the preset priority. Therefore, the controller 140 may determine that the voice commands satisfy the fourth rule. Then, the execution sequence of the voice commands may be calculated into the order in which the voice commands are input. In addition, the controller 140 may rearrange the operations according to the calculated execution sequence and may execute the operations.

Figure 2:
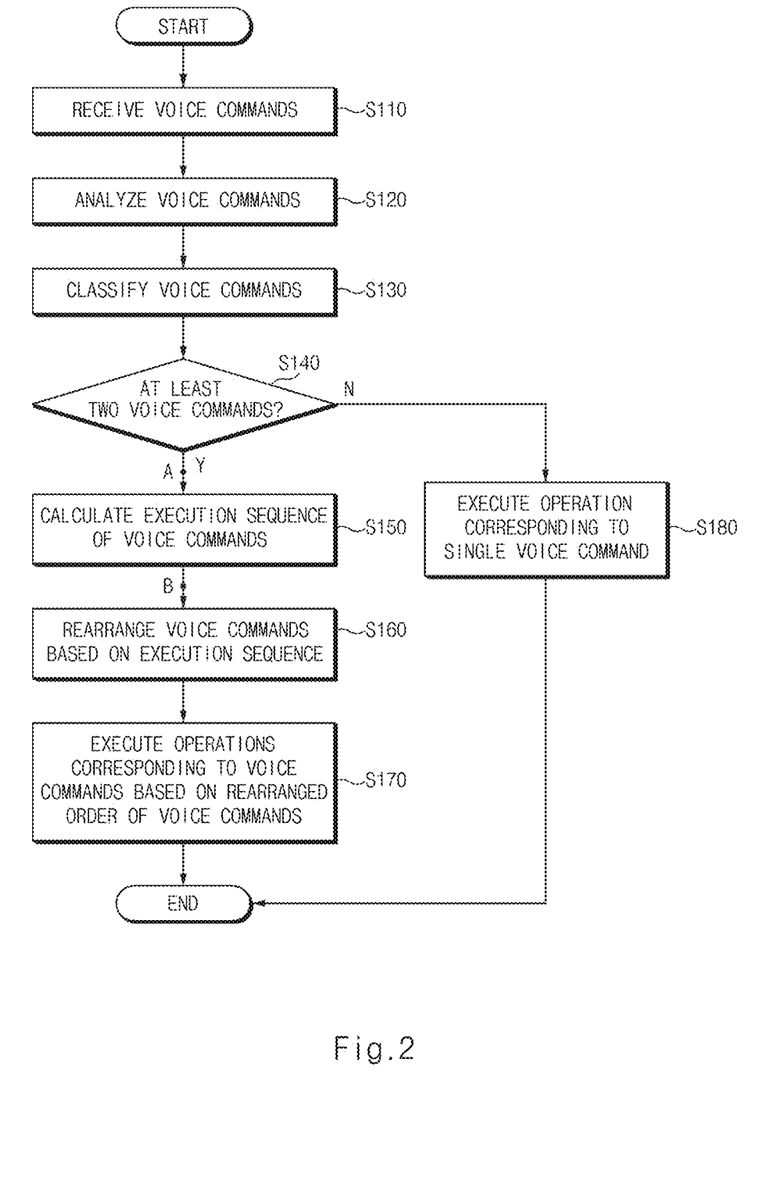
FIG. 2 is a flow chart showing a method for recognition of a voice in a vehicle according to an embodiment of the present disclosure.

FIG. 2 is a flow chart showing a method for recognition of a voice in a vehicle according to an embodiment of the present disclosure.

As shown in FIG. 2, when the controller 140 determines that the user's voice commands are input from the input device 110 (S110), the controller 140 analyzes the voice commands spoken by the user (S120). In S120, the controller 140 analyzes the voice commands spoken from the user to determine domains corresponding to the voice commands and a final purpose related thereto. The controller 140 may derive an analysis result value in a form of a combination of the voice command and the corresponding domain.

The controller 140 may classify the analysis result value (S130). In S130, the controller 140 may classify the analysis result value for each voice command. Thus, the number of classified combinations of the analysis result value may equal to the number of the voice commands (e.g., (domain 1+cmd 1), (domain 2+cmd 2), . . . , (domain N+cmd N)).

Figure 3:
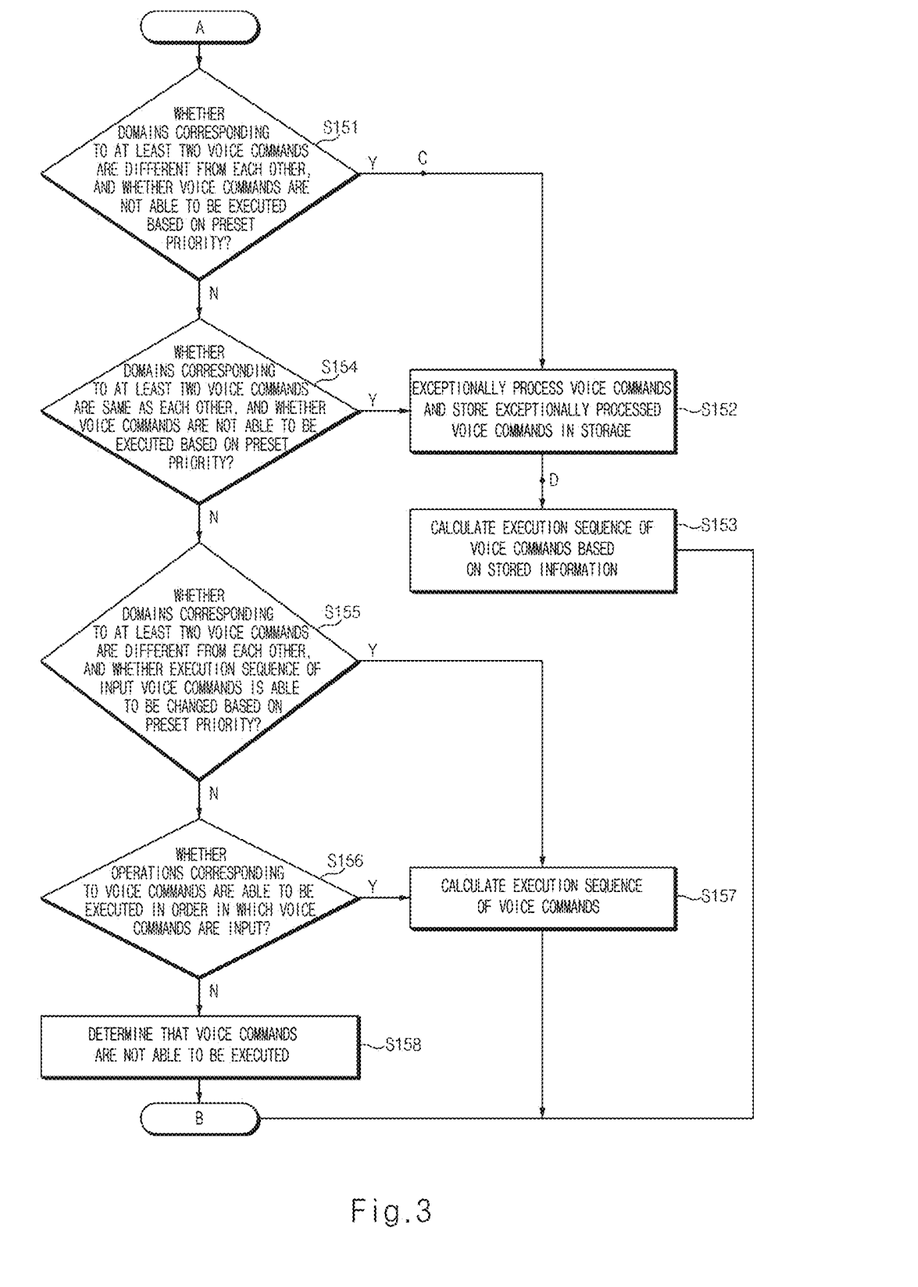
FIG. 3 is a flow chart showing a method for recognition of a voice in a vehicle according to another embodiment of the present disclosure.

The controller 140 determines whether the number of the voice commands input from the user is at least two, based on the classifications of the analysis result (S140). When the controller 140 determines that the number of the voice commands input from the user is at least two (Y) in S140, the controller 140 may calculate the execution sequence of the at least two voice commands (S150). FIG. 3 may be referred to for more detailed descriptions of S150.

The controller 140 rearranges the operations based on the execution sequence calculated in S150 (S160). In addition, the controller 140 may perform the operations corresponding to the voice commands based on the rearranged order (S170).

In one example, when determining that the voice command input from the user is a single voice command (N), based on the classified analysis result, the controller 140 may perform an operation corresponding to the single voice command.

FIG. 3 is a flow chart showing a method for recognition of a voice in a vehicle according to another embodiment of the present disclosure.

Figure 4:
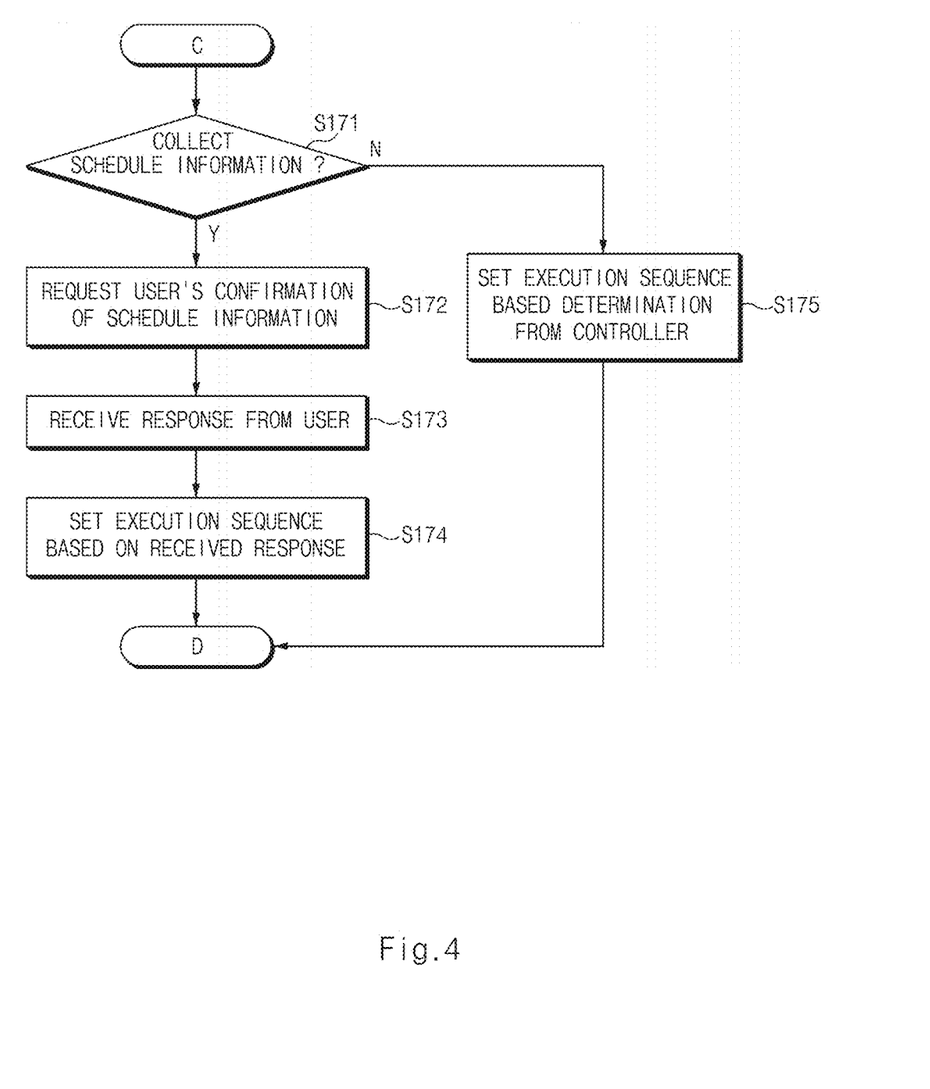
FIG. 4 is a flow chart showing a method for recognition of a voice in a vehicle according to another embodiment of the present disclosure.

As shown in FIG. 3, the controller 140 determines whether the domains corresponding to the voice commands are different from each other and determine whether the operations corresponding to the voice commands are not able to be executed based on the preset priority (S151). According to an embodiment, in S151, the controller 140 determines whether the voice commands input from the user satisfy the first rule. When the controller 140 determines that the voice commands stratify the first rule (Y), the controller 140 may exceptionally process the voice commands. The controller 140 may store the exceptionally processed voice commands, and newly set information corresponding to the exceptionally processed voice commands into the storage (S152). FIG. 4 may be referred to for more detailed descriptions of operations between S151 and S152. In addition, the controller 140 may calculate the execution sequence of the voice commands based on the stored information (S153).

In one example, the controller 140 may determine whether the domains corresponding to the voice commands are the same, and whether the voice commands are not able to be executed based on the preset priority (S154). According to an embodiment, in S154, the controller 140 determines whether the voice commands input from the user satisfy the second rule. When the controller 140 determines in S154 that the voice commands stratify the second rule (Y), the controller 140 may exceptionally process the voice commands. The controller 140 may store the exceptionally processed voice commands, and newly set information corresponding to the exceptionally processed voice commands into the storage (S152). In addition, the controller 140 may calculate the execution sequence of the voice commands based on the stored information (S153). In one example, when the controller 140 determines that the second rule is not satisfied in S154 (N), the controller 140 performs S155.

Moreover, the controller 140 may determine whether the domains corresponding to the voice commands are different from each other, and whether the voice commands are able to be executed based on the preset priority (S155). According to an embodiment, in S155, the controller 140 determines whether the voice commands input from the user satisfy the third rule. When the controller 140 determines that the third rule is satisfied (Y), the controller 140 may calculate the execution sequence of the voice commands (S157). In S157, the controller 140 may calculate the execution sequence of the voice commands based on the preset priority. In one example, when, in S155, the controller 140 determines that the third rule is not satisfied (N), the controller 140 performs S156.

The controller 140 determines whether the operations are able to be executed in the order in which the voice commands are input from the user S156. According to an embodiment, in S156, the controller 140 determines whether the voice commands input from the user satisfy the fourth rule. When it is determined in S156 that the voice commands satisfy the fourth rule (Y), the controller 140 may calculate the execution sequence of the voice commands (S157). In S157, the controller 140 may calculate the execution sequence based on the preset priority or may calculate the execution sequence in the order in which the voice commands are input from the user. In one example, when the controller 140 determines that the fourth rule is not satisfied, the controller 140 may determine that the operations corresponding to the voice commands are not able to be executed (S158).

FIG. 4 is a flow chart showing a method for recognition of a voice in a vehicle according to another embodiment of the present disclosure.

As shown in FIG. 4, the controller 140 determines whether schedule information has been collected S171. When, in S171, the controller 140 determines that the schedule information has been collected (Y), the controller 140 requests the user's confirmation of the schedule information (S172). When the controller 140 has received a response to the requested user confirmation (S173), the controller 140 sets the execution sequence of the operations based on the received response (S174). In one example, when, in S171, the controller 140 determines that the schedule information has not been collected (N), the controller 140 determines whether the operations corresponding to the voice commands are executable. Then, the controller 140 sets the execution sequence based on the determination result. In S175, the controller 140 may determine whether the operations corresponding to the voice commands are able to be executed based on a requirement for operating the ADAS.

Figure 5:
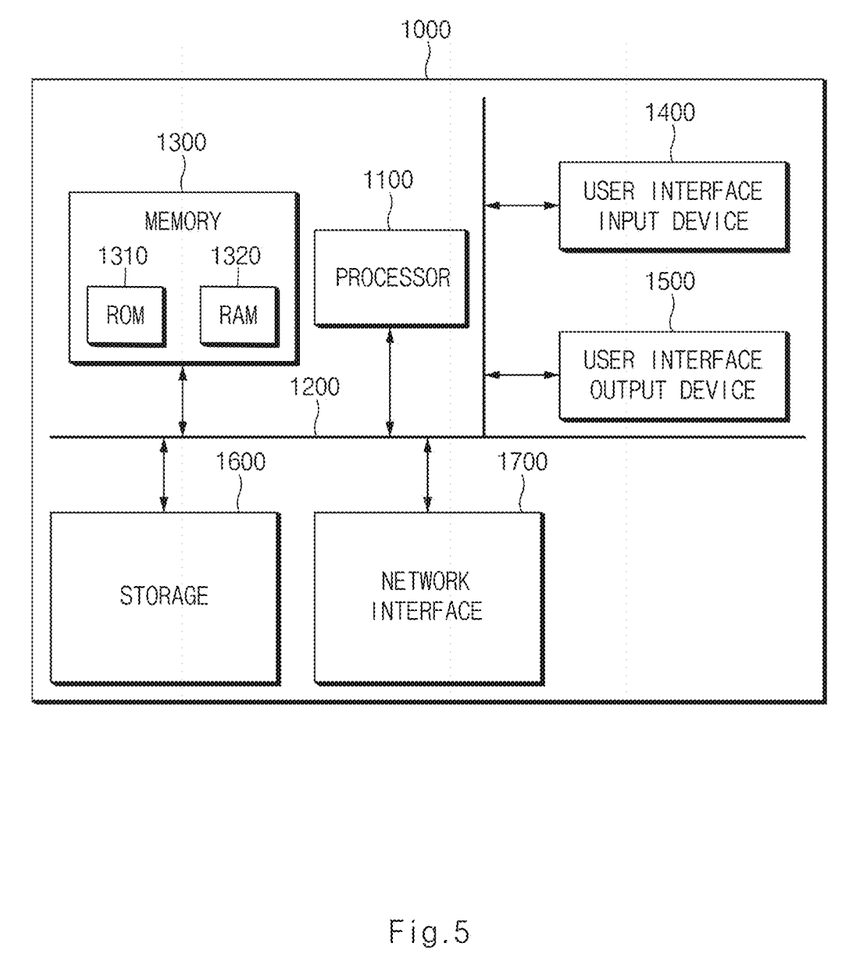
FIG. 5 is a diagram showing a configuration of a computing system executing a method according to an embodiment of the present disclosure.

FIG. 5 is a diagram showing a configuration of a computing system executing a method according to an embodiment of the present disclosure.

Referring to FIG. 5, a computing system 1000 may include at least one processor 1100, a memory 1300, a user interface input device 1400, a user interface output device 1500, a storage 1600, and a network interface 1700. All of those components may be connected to each other via a bus 1200.

The processor 1100 may be a central processing unit (CPU) or a semiconductor device that performs processing of the voice commands stored in the memory 1300 and/or the storage 1600. The memory 1300 and the storage 1600 may include various types of volatile or nonvolatile storage media. For example, the memory 1300 may include ROM (Read Only Memory) 1310 and RAM (Random Access Memory) 1320.

Accordingly, steps of the method or the algorithm described in connection with the embodiments disclosed herein may be directly implemented using hardware, a software module, or a combination of the two, as executed by the processor 1100. The software module may reside in a storage medium (e.g., the memory 1300 and/or the storage 1600) such as a RAM, a flash memory, a ROM, an EPROM, an EEPROM, a register, a hard disk, a removable disk, a CD-ROM. The storage medium may be coupled to the processor 1100. The processor 1100 may read information from the storage medium and write information to the storage medium. In another example, the storage medium may be integral with the processor 1100. The processor and the storage media may reside within an application-specific integrated circuit (ASIC). The ASIC may reside in a user terminal. In another example, the processor and the storage medium may reside as separate components within the user terminal.

In the apparatus and the method for recognizing the voice in the vehicle according to the embodiment of the present disclosure, when the at least two voice commands are input, the operations corresponding to the voice commands are executed in an optimized state to prevent an unnecessary operation, and to maximize the user's convenience.

Hereinabove, although the present disclosure has been described with reference to embodiments or examples and the accompanying drawings, the present disclosure is not limited thereto. The disclosure may be variously modified and altered by those having ordinary skill in the art to which the present disclosure pertains without departing from the spirit and scope of the present disclosure claimed in the following claims.

What is claimed is:

1. An apparatus for recognizing a voice in a vehicle, the apparatus comprising:
    an input device for receiving a voice command; and
    a controller configured to
        determine whether the number of the voice commands is at least two,
        determine whether the voice commands are able to be executed based on a preset priority, when the number of the voice commands is at least two,
        calculate an execution sequence of the voice commands based on the determination result, and
        allow operations corresponding to the voice commands to be executed based on the calculated execution sequence of the voice commands.

2. The apparatus of claim 1, wherein the controller is configured to determine a domain corresponding to each of the voice commands, and a final purpose related to the voice commands.

3. The apparatus of claim 2, wherein the priority is set based on an urgency level allocated to each domain.

4. The apparatus of claim 2, wherein the controller is configured to:
    determine whether an operation unnecessary to achieve the final purpose is included in the operations corresponding to the voice commands; and
    determine that the voice commands are not able to be executed based on the preset priority, when determining that the unnecessary operation is included.

5. The apparatus of claim 4, wherein the controller is configured to:
    exceptionally process the voice commands, when determining that the voice commands are not able to be executed based on the preset priority; and
    store the operations corresponding to the exceptionally processed voice commands.

6. The apparatus of claim 5, wherein the controller is configured to remove the unnecessary operation.

7. The apparatus of claim 5, wherein the controller is configured to calculate the execution sequence of the voice commands based on the operations corresponding to the exceptionally processed voice commands.

8. The apparatus of claim 2, wherein, when the domains corresponding to the at least two voice commands are different from each other, and when the execution sequence of the input voice commands is able to be changed based on the preset priority, the controller is configured to determine that the voice commands are able to be executed based on the preset priority, and to calculate the execution sequence of the voice commands based on the preset priority.

9. The apparatus of claim 2, wherein, when the domains corresponding to the at least two voice commands are different from each other, and when an order in which the voice commands are input is the same as the preset priority, the controller is configured to determine that the voice commands are able to be executed based on the preset priority, and to calculate the execution sequence of the voice commands based on the preset priority.

10. The apparatus of claim 2, wherein, when the domains corresponding to the at least two voice commands are same as each other, and when the operations corresponding to the voice commands are able to be executed in an order in which the voice commands are input, the controller is configured to determine that the voice commands are able to be executed based on the preset priority, and to calculate the execution sequence of the voice commands based on the order in which the voice commands are input.

11. A method for recognizing a voice in a vehicle, the method comprising:
receiving a voice command;
determining whether the number of the voice commands is at least two;
determining whether the voice commands are able to be executed based on a preset priority, when the number of the voice commands is at least two;
calculating an execution sequence of the voice commands based on the determination result; and
executing operations corresponding to the voice commands based on the calculated execution sequence of the voice commands.

12. The method of claim 11, further comprising, after receiving the voice command, determining a domain corresponding to each of the voice commands and determining a final purpose related to the voice commands.

13. The method of claim 12, wherein the priority is set based on an urgency level allocated to each domain.

14. The method of claim 12, wherein the determining of whether the voice commands are able to be executed based on the preset priority includes:
determining whether an operation unnecessary to achieve the final purpose is included in the operations corresponding to the voice commands; and
determining that the voice commands are not able to be executed based on the preset priority, when determining that the unnecessary operation is included.

15. The method of claim 14, further comprising:
excluding the voice commands, when determining that the voice commands are not able to be executed based on the preset priority; and
storing the operations corresponding to the exceptionally processed voice commands.

16. The method of claim 15, wherein the storing of the operations corresponding to the voice commands includes removing the unnecessary operation.

17. The method of claim 15, wherein the calculating of the execution sequence of the voice commands based on the determination result includes calculating the execution sequence of the voice commands based on the operations corresponding to the exceptionally processed voice commands.

18. The method of claim 12, wherein the calculating of the execution sequence of the voice commands based on the determination result includes:
when the domains corresponding to the at least two voice commands are different from each other, and the execution sequence of the input voice commands is able to be changed based on the preset priority, determining that the voice commands are able to be executed based on the preset priority and calculating the execution sequence of the voice commands based on the preset priority.

19. The method of claim 12, wherein the calculating of the execution sequence of the voice commands based on the determination result includes:
when the domains corresponding to the at least two voice commands are different from each other, and an order in which the voice commands are input is the same as the preset priority, determining that the voice commands are able to be executed based on the preset priority and calculating the execution sequence of the voice commands based on the preset priority.

20. The method of claim 12, wherein the calculating of the execution sequence of the voice commands based on the determination result includes:
when the domains corresponding to the at least two voice commands are same as each other, and the operations corresponding to the voice commands are able to be executed in an order in which the voice commands are input, determining that the voice commands are able to be executed based on the preset priority and calculating the execution sequence of the voice commands based on the order in which the voice commands are input.

* * * * *